(12) United States Patent
Bates et al.

(10) Patent No.: US 7,035,902 B1
(45) Date of Patent: Apr. 25, 2006

(54) METHOD, ARTICLE OF MANUFACTURE AND APPARATUS FOR PROCESSING AN ELECTRONIC MAIL DOCUMENT

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 09/637,294

(22) Filed: Aug. 11, 2000

(51) Int. Cl.
*G06F 15/16* (2006.01)

(52) U.S. Cl. ............... 709/206; 709/206; 709/207; 709/216; 709/217

(58) Field of Classification Search ........... 709/206, 709/205, 204, 203, 222, 220, 225, 227, 257, 709/217, 216
See application file for complete search history.

(56) References Cited

U.S. PATENT DOCUMENTS

| | | | | |
|---|---|---|---|---|
| 5,751,960 A | * | 5/1998 | Matsunaga | 709/206 |
| 5,781,901 A | * | 7/1998 | Kuzma | 707/10 |
| 5,850,520 A | * | 12/1998 | Griebenow et al. | 709/206 |
| 5,870,548 A | * | 2/1999 | Nielsen | 709/206 |
| 5,903,723 A | * | 5/1999 | Beck et al. | 709/200 |
| 5,961,590 A | * | 10/1999 | Mendez et al. | 709/206 |
| 6,018,762 A | * | 1/2000 | Brunson et al. | 709/206 |
| 6,021,427 A | * | 2/2000 | Spagna et al. | 709/206 |
| 6,094,681 A | * | 7/2000 | Shaffer et al. | 709/224 |
| 6,178,442 B1 | * | 1/2001 | Yamazaki | 709/206 |
| 6,549,957 B1 | * | 4/2003 | Hanson et al. | 710/5 |
| 6,618,747 B1 | * | 9/2003 | Flynn et al. | 709/206 |
| 6,628,306 B1 | * | 9/2003 | Marchionda | 345/752 |
| 6,651,087 B1 | * | 11/2003 | Dennis | 709/206 |
| 6,687,741 B1 | * | 2/2004 | Ramaley et al. | 709/206 |

\* cited by examiner

*Primary Examiner*—Ario Etienne
*Assistant Examiner*—Sahera Halim
(74) *Attorney, Agent, or Firm*—Patterson & Sheridan, LLP

(57) ABSTRACT

A method, article of manufacture, and apparatus for processing an electronic mail (e-mail) document having a data portion. In one embodiment, a determination is made as to whether a recipient computer addressed in the e-mail document has received the data portion. The data portion is sent to the recipient computer if the recipient computer has not previously received the data portion. In another embodiment, at least one partial message previously parsed from an e-mail document at the sender computer is received at a recipient computer. Each partial message comprises a data portion if the data portion was not previously received, or comprises a pointer referencing the data portion in a recipient computer if the data portion was previously received. The e-mail document is constructed from the at least one partial message.

23 Claims, 7 Drawing Sheets

500

| USER ( SENDER ) | —520 |
| TIMESTAMP ( DATE, TIME ) | —530 |
| MESSAGE IDENTIFIER | —540 |
| MESSAGE TYPE | —550 |
| SEQUENCE NUMBER | —560 |
| MAXIMUM SEQUENCE NUMBER | —570 |
| DATA PORTION | —510 |

| USER ( SENDER ) | —610 |
| TIMESTAMP ( DATE, TIME ) | —620 |
| CYCLICAL REDUNDANCY CHECK | —630 |

| USER ( SENDER ) | —710 |
| TIMESTAMP ( DATE, TIME ) | —720 |
| NAME OF ATTACHMENT FILE | —730 |
| CYCLICAL REDUNDANCY CHECK | —740 |

| REQUESTING USER | —810 |
| MESSAGE IDENTIFIER | —820 |
| SEQUENCE NUMBER | —830 |

*Fig. 8*

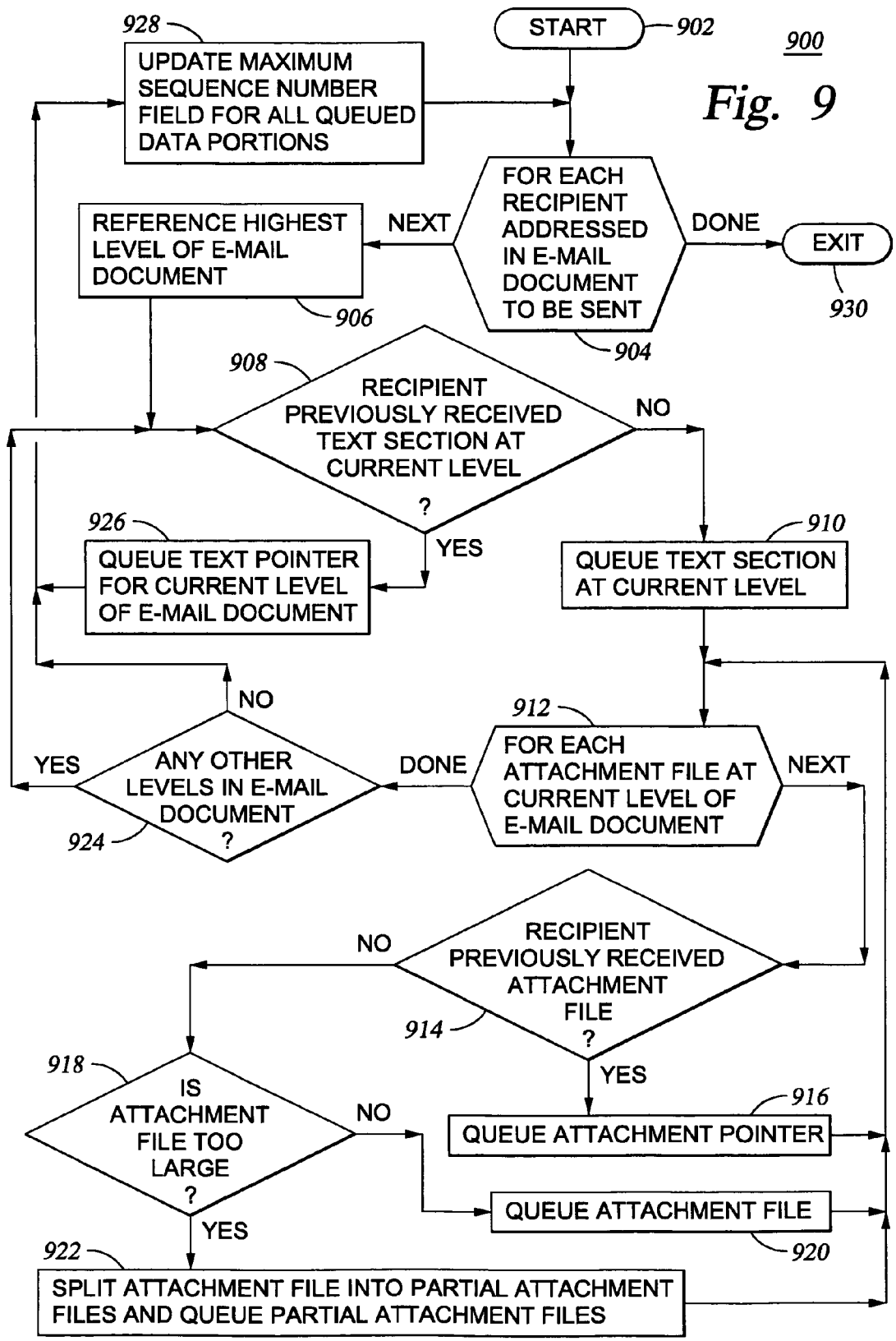

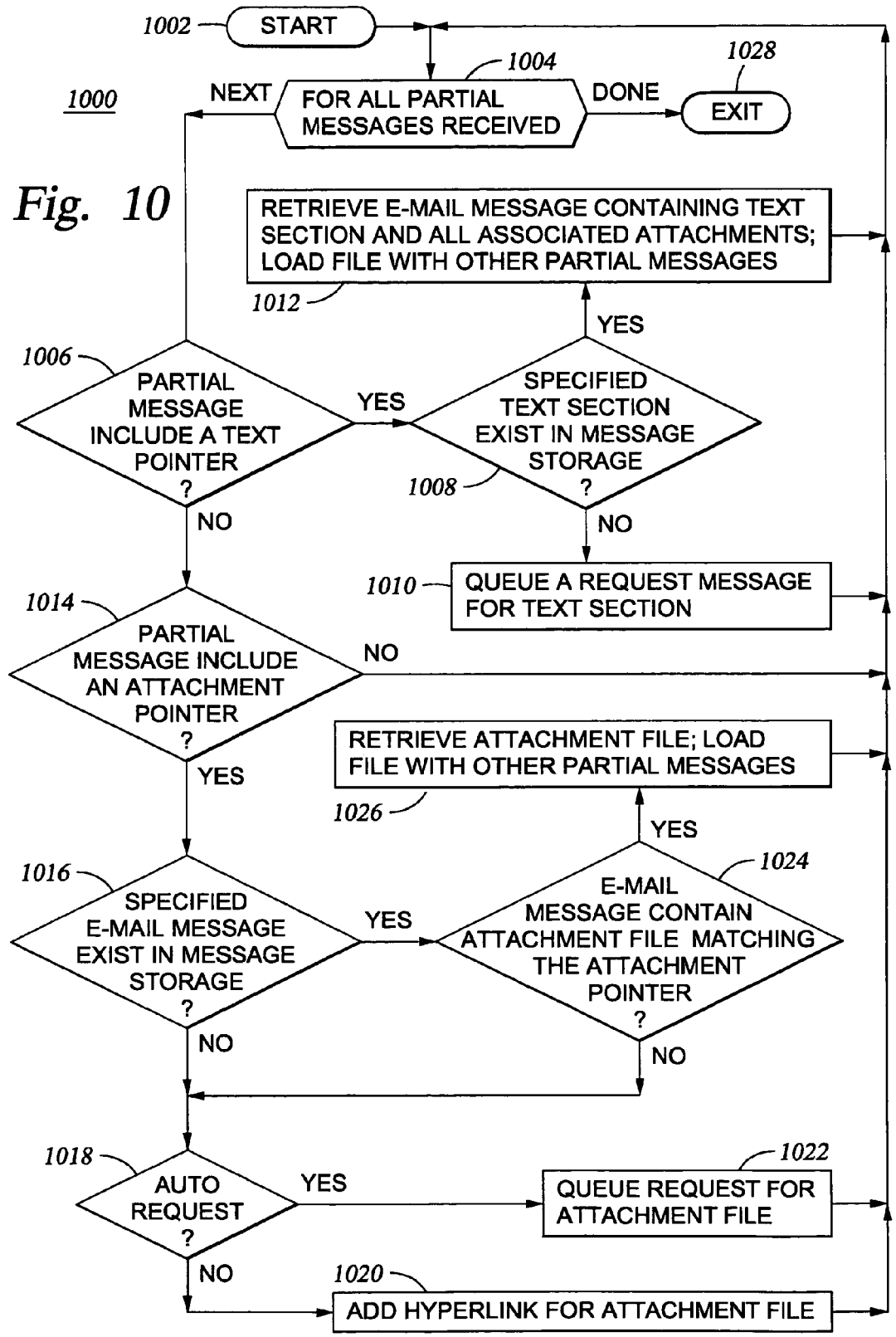

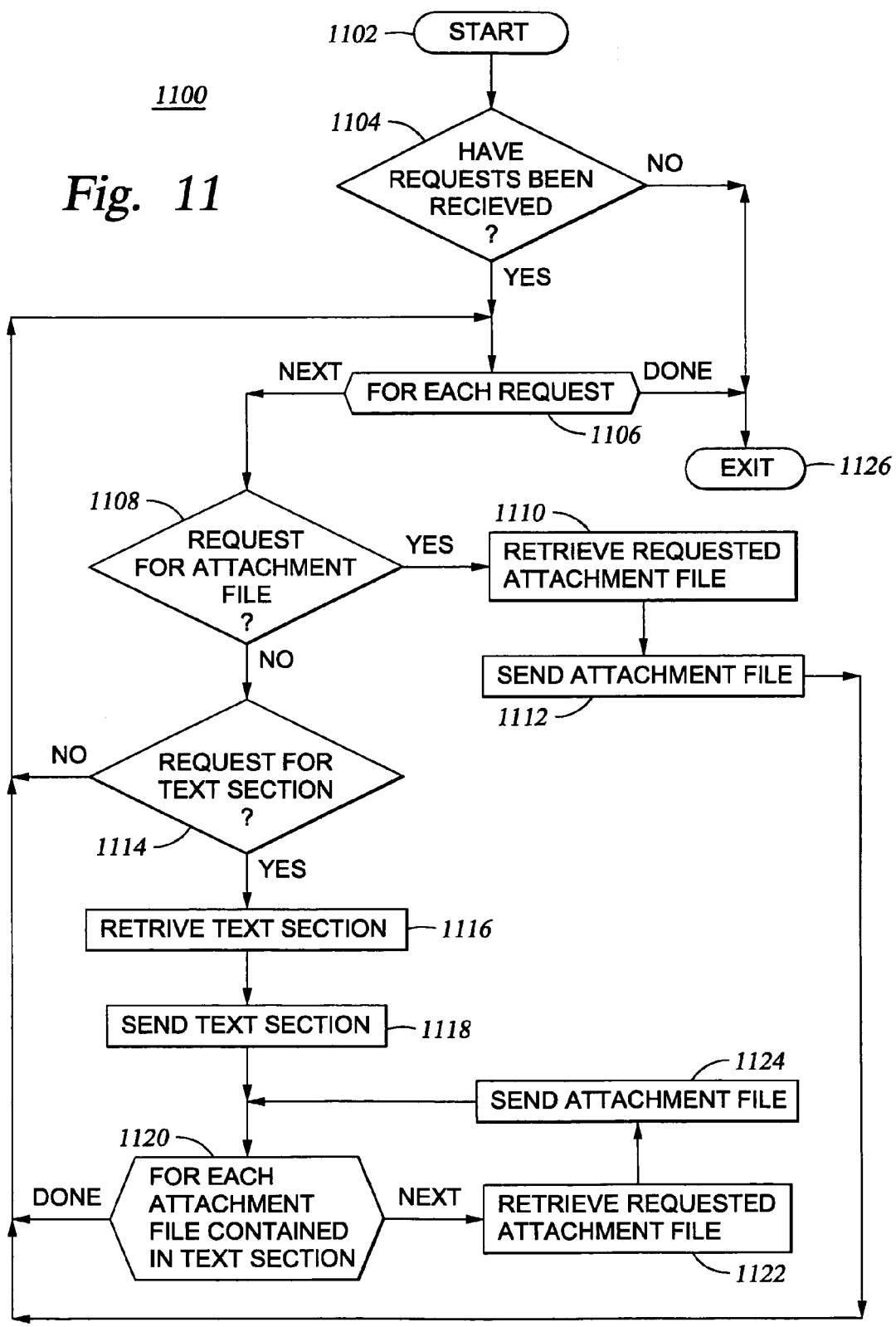

METHOD, ARTICLE OF MANUFACTURE AND APPARATUS FOR PROCESSING AN ELECTRONIC MAIL DOCUMENT

BACKGROUND OF THE INVENTION

1. Field of the Invention

The invention relates to electronic mail systems and, more particularly, the invention relates to a method, article of manufacture and apparatus for processing electronic mail documents comprising an electronic mail message having a data portion such as a text section or an attachment file.

2. Background of the Related Art

In today's electronic mail (e-mail) environment, users send e-mail documents to other users of recipient computers. The e-mail documents generally comprise at least one data portion such as a text section or an attachment file. The text section may include the body of an e-mail message contained in the electronic document. The attachment file may include a text file, a voice file, a video file, a high-resolution graphic file and the like.

Attachment files are often sent with the e-mail document using a "reply with history" feature. This "reply with history" feature is utilized to reply to or forward an e-mail document with the contents of a previously received e-mail document. Repeated utilization of the reply with history feature generates an e-mail document having multiple levels of e-mail messages, where a prior e-mail message or lower level of the e-mail document is nested within a more recent e-mail message or higher level of the e-mail document.

As e-mail documents are frequently sent among various users, a particular user or recipient often receives multiple copies of a particular attachment file. These multiple copies require additional memory to store the attachment files at the recipient computer. This problem is exacerbated if the attachment files comprises large files, e.g., video files and high-resolution graphic files. Moreover, the transmission of multiple copies of large attachments clutters the e-mail system utilized to transfer e-mail documents among sender and recipient computers.

Therefore, a need exists for a method, article of manufacture and apparatus for reducing the copies of attachment files transmitted through an e-mail system.

SUMMARY OF THE INVENTION

The invention provides a method, article of manufacture and apparatus for processing an electronic mail (e-mail) document comprising a data portion such as a text section of an e-mail message, an attachment file or both. One example of an e-mail document is a text message having an attached graphics file. The text message, the graphics file and any other information carried in the e-mail document is broadly defined herein as a data portion.

In one embodiment, the invention provides a method for sending an e-mail document containing a data portion. Specifically, the method comprises determining whether a recipient computer addressed in the e-mail document has previously received the data portion of the e-mail document, and sending the data portion to the recipient computer if the recipient computer has not previously received the data portion.

In another embodiment, the invention provides a method for processing an e-mail document received at a recipient computer. The method comprises receiving at least one partial message previously parsed from an e-mail document at a sender computer and constructing the e-mail document from the at least one partial message. Each partial message comprises a data portion if the recipient computer has not previously received that data portion, or comprises a pointer if the recipient computer has previously received the referenced data portion. The pointer references a particular data portion located at a recipient computer receiving at least one partial message.

In another embodiment, the invention provides a method for processing an electronic mail document having a data portion. Initially, the method comprises determining whether a recipient computer addressed in the electronic mail document has previously received the data portion, and sending the data portion from a sender computer to the recipient computer if the recipient computer has not previously received the data portion. The method further comprises sending a pointer to from a sender computer to the recipient computer if the recipient computer has previously received the data portion, where the pointer is used to reference the data portion at the recipient computer. Finally, the method further comprises receiving at least one of the data portion and the pointer at the recipient computer, and constructing the electronic document at the recipient computer, where the electronic document is constructed from at least one of the data portion and the pointer.

The invention also provides an apparatus comprising a memory unit and a processor, where the apparatus is configured for processing an e-mail document. The memory unit stores a mail routine. After the mail routine is retrieved from the memory unit, the processor executes the mail routine, and determines whether a recipient computer addressed in the e-mail document has previously received a data portion that is to be sent. The processor sends the data portion to the recipient computer if the recipient computer has not previously received the data portion.

Additionally, a computer readable medium storing a software program is provided, where the software program, when executed by a processor of a computer, causes the computer to perform a method. In one embodiment of the computer readable medium, the method comprises determining whether a recipient computer has previously received an electronic mail document having a particular data portion, and sending the data portion to the recipient computer if the recipient computer not previously received the data portion. In another embodiment of the computer readable medium, the method comprises receiving at least one partial message previously parsed from an e-mail document at a sender computer and constructing the e-mail document from the at least one partial message. Each partial message comprises a data portion if the recipient computer has not previously received that data portion, or comprises a pointer if the recipient computer has previously received the referenced data portion. The pointer references a particular data portion located at a recipient computer receiving at least one partial message.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
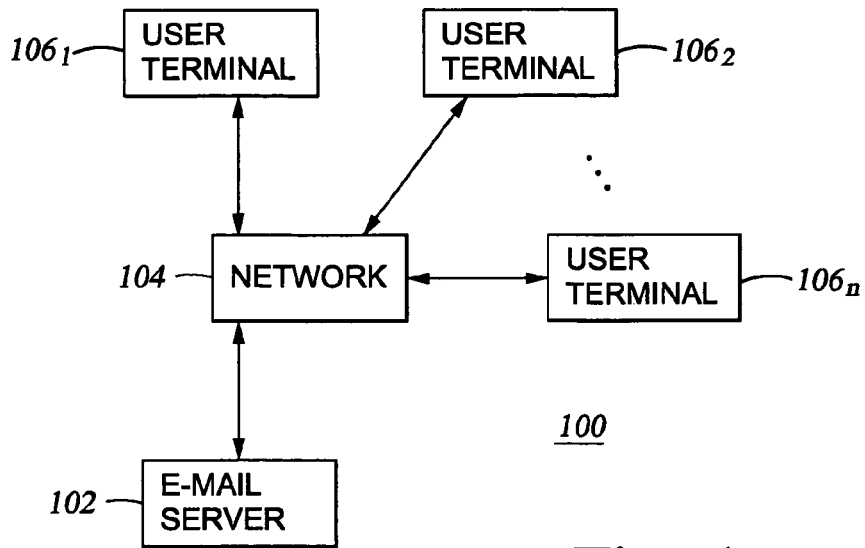
Figure 4:
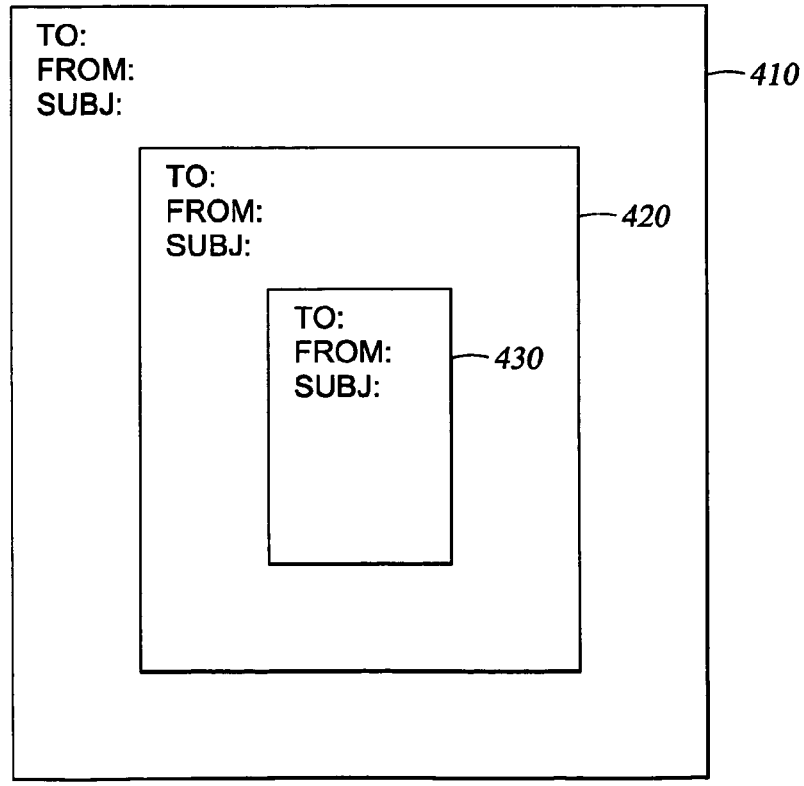
Figure 2:
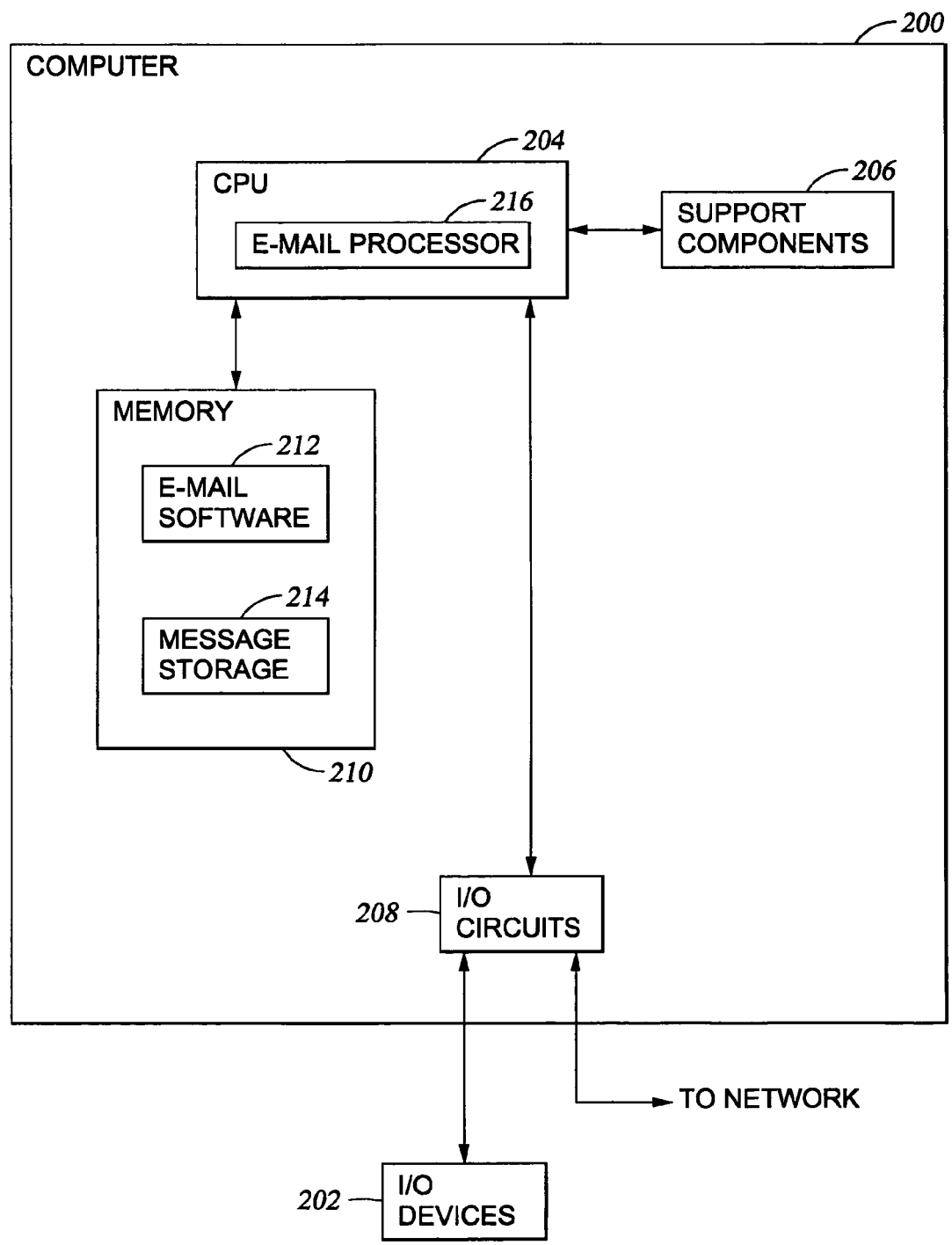
Figure 3:
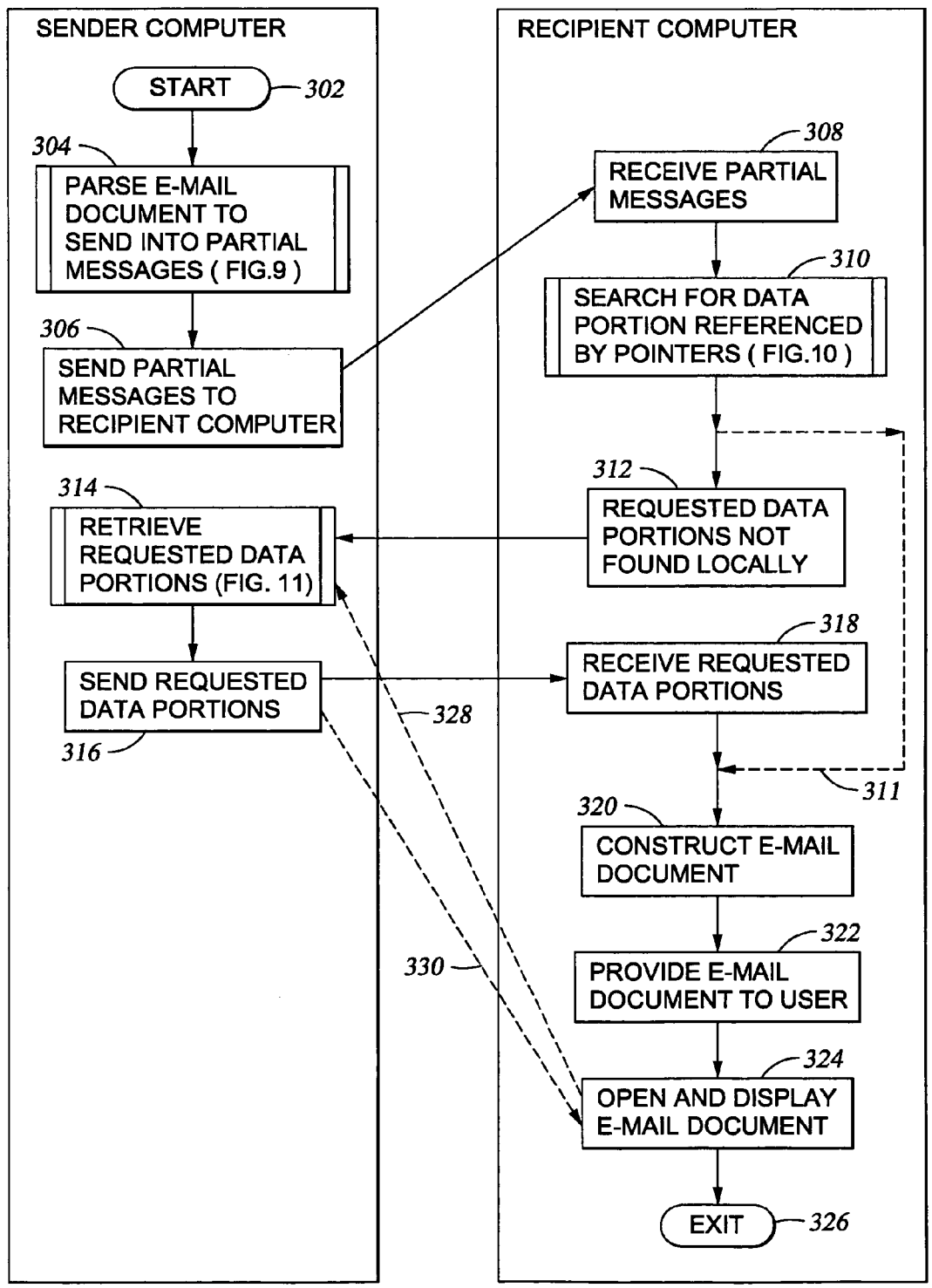

The teachings of the present invention can be readily understood by considering the following detailed description in conjunction with the accompanying drawings, in which:

FIG. 1 depicts a simplified block diagram of an electronic mail (e-mail) system that benefits from the present invention;

FIG. 2 depicts a simplified block diagram of a user terminal (computer) within the electronic mail system of FIG. 1;

FIG. 3 depicts a flow diagram of a mail program for processing an e-mail document in accordance with the present invention;

FIG. 4 depicts an e-mail document having multiple levels of e-mail messages;

FIG. 5 depicts a data format of a partial message utilized in the present invention;

FIG. 6 depicts a data format of a text pointer provided in one type of partial message shown in FIG. 5;

FIG. 7 depicts a data format of an attachment pointer provided in another type of partial message shown in FIG. 5;

FIG. 8 depicts a data format of a request message;

FIG. 9 depicts a flow diagram for processing partial messages of FIG. 5 for an e-mail document of FIG. 4;

FIG. 10 depicts a flow diagram for processing partial messages of FIG. 5 having a text pointer of FIG. 6 or an attachment pointer of FIG. 7; and FIG. 11 depicts a flow diagram for retrieving text sections and attachment files requested using the request message of FIG. 8.

To facilitate understanding, identical reference numerals have been used, where possible, to designate identical elements that are common to the figures.

DETAILED DESCRIPTION OF THE PREFERRED EMBODIMENT

The present invention provides a method, article of manufacture, and apparatus for processing an electronic mail (e-mail) document having a data portion. A data portion is any information-carrying portion of an e-mail document including a textual e-mail message, an attachment file and the like. In one embodiment, a determination is made as to whether a recipient computer addressed in the e-mail document has previously received the data portion. The data portion is sent to the recipient computer if the recipient computer has not previously received the data portion. In another embodiment, at least one partial message previously parsed from an e-mail document at a sender computer is received at a recipient computer. Each partial message comprises a data portion if the data portion has not been previously received, or a pointer referencing the data portion in a recipient computer if the data portion was previously received. The e-mail document is constructed from the at least one partial message.

FIG. 1 depicts an electronic mail (e-mail) system 100 that benefits from the use of the present invention. One embodiment of the invention comprises an executable software routine(s) that generally resides within the user terminals 106. The system 100 comprises an e-mail server 102, a network 104 and a plurality of user terminals $106_1, 106_2, \ldots 106_n$. Each user terminal may be a computer system, an e-mail enabled network appliance, an e-mail enabled wireless device and the like. The user terminals 106 are connected to one another through the network 104 and also connected through the network 104 to the e-mail server 102. The e-mail server 102 provides e-mail services to all of the user terminals 106 such that e-mail addressed from one terminal to another is routed through the network 104 to the e-mail server 102. Each user terminal 106 may then retrieve its e-mail from the e-mail server 102. Although the system is shown having a hub and spoke configuration, other forms of networks may also benefit from the invention.

FIG. 2 depicts one embodiment of a user terminal 106, e.g., a general purpose computer system, that can be used to implement the invention. User terminal 106 comprises a computer 200 and an input/output device or devices 202 such as a monitor, a keyboard, a mouse, a trackball and the like. The computer 200 comprises a central processing unit 204, support components 206, input/output circuits 208 and a memory unit 210. The memory unit 210 may comprise a solid state memory, a disc drive, an optical memory, a removable memory device, or a combination of any of these memory devices. The input/output circuits 208 provide a well-known interface from the CPU 204 to the I/O devices 202. The support components 206 are well known in the art and include such circuits as cache, power supplies, clock circuits, and the like. The combination of all of these circuits, components and elements forms a general purpose computer that, when executing a particular software package or routine, forms a specific purpose computer. In this case, the CPU 204, when executing the electronic mail processing software 212 (mail routine) of the present invention, operates as an e-mail processor 216. The e-mail software 212 resides in memory unit 210. In addition, the e-mail messages are stored in a message storage 214 within the memory unit 210. In addition, the I/O circuits 208 generally contain a network interface card or modem that couples the computer to the network of FIG. 1 such that e-mail messages can be routed to and from the computer 200.

In one embodiment of the present invention, the e-mail processor 216 determines whether a recipient computer has previously received a particular data portion of an e-mail document, and sends the data portion to the recipient computer only if the recipient computer has not previously received the data portion.

In another embodiment of the present invention, the e-mail processor 216 receives at least one partial message previously parsed from an e-mail document at a sender computer. The e-mail processor 216 then constructs or recreates the e-mail document from the at least one partial message. Each partial message comprises a data portion if the recipient computer has not previously received that data portion, or comprises a pointer if the recipient computer has previously received the referenced data portion. The pointer references a particular data portion located at a recipient computer receiving at least one partial message.

As will be described in detail below, a further embodiment of the present invention is implemented as a program product for use with a computer system such as, for example, the e-mail system 100 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

FIG. 3 depicts a flow diagram of a mail program for handling e-mail documents having data portions in accordance with the present invention. FIGS. 4–8 depicts a structure or format of data transmission between a sender computer and a recipient computer. FIGS. 9–11 depict specific routines implemented within the mail program of FIG. 3.

Referring to FIG. 3, the mail program is embodied in a method 300 that starts at step 302. The method 300 proceeds to step 304, where an e-mail document is parsed into partial messages to be sent to a recipient computer. An illustrative e-mail document is depicted in FIG. 4, and an illustrative partial message is depicted in FIG. 5. The details of these message structures are discussed below with respect to FIGS. 4 and 5. While parsing the e-mail document into partial messages, step 304 determines whether a recipient computer has previously received each data portion in the e-mail document. Illustratively, such data portions may comprise a text section or an attachment file. The text section represents the body, e.g., text messages or typed portions, of an e-mail message contained in the e-mail document. The attachment file may comprise a voice file, a video file, a high-resolution graphic file, a text file and the like.

If the recipient computer has not previously received a particular data portion, the partial message from the sender computer simply includes the data portion. However, if the recipient computer has previously received the data portion, the partial message comprises a pointer that references a local copy of the data portion at the recipient computer. Step 304 is further embodied in a method 900 as described below with respect to FIG. 9. For purposes of illustration, it is assumed that the partial messages constructed at step 304 contain both data portions themselves as well as a pointer(s) pointing to a local copy of the data portion at the recipient computer. However, it is understood that in some applications, the partial messages may include either data portions or pointers.

After parsing the e-mail document into partial messages, the method 300 proceeds to step 306, where the partial messages are sent to a recipient computer addressed in the e-mail document. The method 300 proceeds to step 308, where the recipient computer receives the partial messages. At step 310, the method 300 searches for the data portions, as referenced by a pointer in the partial message, in the message storage 214 at the recipient computer. Step 310 is further embodied in a method 1000 as described below with respect to FIG. 10.

Step 310 is implemented for each data portion previously received by the recipient computer. If the data portion is present in the message storage 214, the data portion is retrieved from the message storage 214 and the method 300 proceeds to step 320 to construct an e-mail document. Alternatively, if the data portion is present in the message storage 214, the method proceeds to step 320, where a "hyperlink" is provided when constructing the e-mail document. If the user clicks or otherwise selects the hyperlink, the data portion is retrieved from the message storage 214 and constructed with the e-mail document. The logic path from step 310 to step 320 is represented by dotted line 311.

However, if the data portion is not present or no longer present in the message storage 214 of the recipient computer, the method 300 proceeds to step 312, where a request for the missing data portion is made to the sender computer or the terminal that sent the partial messages. Such a request is embodied in a request message as described below with respect to FIG. 8.

The method 300 then proceeds to step 314, where the requested data portions are retrieved by the sender computer. Step 314 is further embodied in a method 1100 as described below in FIG. 11. The method 300 proceeds to step 316, where the requested data portions are sent to the recipient computer. The requested data portions may be sent within partial messages as performed in step 306.

After sending the requested data portions at step 316, the method 300 proceeds to step 318, where the recipient computer receives the requested data portions. The method 300 proceeds to step 320, where the e-mail document is constructed from each data portion received at steps 308 and 318 and any data portion retrieved at step 310. The constructed e-mail document is provided as a received e-mail document at step 322 and opened at step 324. After opening the e-mail document, the method 300 proceeds to exit at step 326.

In another embodiment, the method 300 may utilize a "hyperlink" if a data portion is not present in the message storage 214 (of the memory unit 210) at the recipient computer. In this case, the e-mail document is initially constructed from any data portions received at steps 308 and retrieved from the message storage 214 at step 310. Any data portions not present in the message storage 214 of the memory unit 210 would be represented as a hyperlink in the partial message. Thus, once the e-mail document is constructed at step 320, provided at step 322 and opened at step 324, the displayed e-mail document includes data portions obtained from steps 308 and 310, and hyperlinks representing data portions not in the memory storage 214 of the memory unit 210.

If the user clicks or otherwise selects the hyperlink at the recipient computer, a request is provided from the recipient computer to the sender computer, i.e., the computer sending the partial messages. This request is depicted in FIG. 3 as a dotted line 328. The requested data portion is retrieved from the sender computer at step 314 and sent to the recipient computer at step 316 as represented by dotted line 330. Once the recipient computer receives the data portion sent from the sender computer, the recipient computer displays the requested data portion in the opened e-mail document at step 326. After displaying the data portion at step 324, the method 300 proceeds to exit at step 326.

FIG. 4 depicts an illustrative e-mail document 400 having three levels of e-mail messages. Specifically, the e-mail document 400 comprises an e-mail message 410 at a first level, an e-mail message 420 at a second level, and an e-mail message 430 at a third level. Thus, the e-mail document 400 comprises a nested-message structure, where an e-mail message at a higher level is nested within an e-mail message at a lower level. For example, the e-mail message 430 at the third level is nested in the e-mail message 420 at the second level, which is nested in the e-mail message 410 at the first level. Such a nested-message structure is commonly implemented when e-mail messages are sent with the "reply with history feature." Although the e-mail document 400 depicted in FIG. 4 comprises three levels of e-mail messages, the invention similarly applies to e-mail documents having any number of levels.

FIG. 5 depicts the data format for one embodiment of a partial message 500. In one embodiment of the present invention, each data portion, in the e-mail document 400, is represented by a partial message 500. Each partial message 500 may comprise either a data portion if the recipient computer has not previously received the data portion, or a pointer if the recipient computer has previously received the data portion referenced by the pointer. Examples of data portions include a text section of an e-mail message, an attachment file, or a partial attachment file if the attachment file is too large to send in its entirety.

More specifically, the partial message comprises a data field 510, a user field 520, a timestamp 530, a message identifier field 540, a message type field 550, a sequence number field 560, and a maximum sequence number field 570. The data field 510 includes either a data portion or a pointer, while the other fields identify the partial message 500. The user field 520 identifies the sender of the partial message 500. The timestamp 530 comprises the date and time of the partial message 500. The message identifier 540 comprises a unique identifier assigned to the partial message 500. The message type field 550 identifies the type of information contained in the data portion 510 of the partial message. For example, the message type field 550 may identify the partial e-mail message as having a text section, an attachment file, a partial attachment file, a text pointer, and an attachment pointer. The sequence number field 560 identifies the position, e.g., logical number, of the partial message relative to all the partial messages in the e-mail document to be sent. The maximum sequence field 570 represents the total number of the partial messages to be sent in all levels of the e-mail document 400, i.e., all the e-mail messages in the e-mail document 400.

In accordance with the present invention, the text pointer, as contained in the data field 510 of the partial message 500, is utilized to reference a text section in the recipient computer if the recipient computer has previously received the text section referenced by the text pointer. The text section represents the body of an e-mail message contained in the e-mail document 400. In a similar manner, the attachment pointer is utilized to reference an attachment file in the recipient computer if the recipient computer has previously received the attachment file reference.

FIG. 6 depicts a format of a text pointer 600 utilized in the data field 510 of the partial message 500. The text pointer 600 is provided in the data field 510 if the recipient computer has already received the text section referenced by the text pointer 600. By sending the text pointer 600 instead of the text section, the present invention avoids cluttering the e-mail system 100 that occurs from transmitting redundant text sections to the recipient computer. Specifically, the text pointer 600 comprises a user field 610, a timestamp 620 and a CRC (cyclical redundancy check) field 630. The user field 610 and timestamp 620 are utilized to identify the previously received e-mail message 410, 420 or 430 containing the referenced text. The CRC field 630 is utilized to verify the referenced text.

FIG. 7 depicts the format of an attachment pointer 700 utilized in the data field 510 of the partial message 500. The attachment pointer 700 is provided in the data field 510 if the recipient computer has already received the attachment file referenced by the attachment pointer 700. By sending the attachment pointer 700 instead of the (much larger) attachment file, the present invention further avoids cluttering the e-mail system 100 that occurs from transmitting a redundant attachment files to the recipient computer. The attachment pointer comprises a user field 710, a timestamp 720, an attachment name 730 and a CRC field 740. The user field 710 and timestamp 720 are utilized to identify the e-mail message 410, 420 or 430 containing the attachment file. The attachment name 730 is utilized to identify the attachment. The CRC field 740 is utilized to verify the attachment file.

FIG. 8 depicts the format of a request message 800 sent by a recipient computer to a sender computer. The request message 800 is sent at step 312 if the data portion referenced by a text pointer or an attachment pointer was not locally available in the message storage 214 of the recipient computer. The request message 800 represents a request to the sender computer to send a data portion referenced by the text pointer or attachment pointer and not locally retrievable from the message storage 214 of the recipient computer.

More specifically, the request message 800 comprises a user field 810, a message identifier field 820, a sequence number field 830 and a data field 840. The user field 810 identifies the recipient sending the request message 800. The message identifier field 820 is the identifier of the partial message 500 related to the data portion requested by the recipient computer. The sequence number field 830 identifies the position, e.g., logical number, of the partial message relative to all the partial messages in the e-mail document sent by the sender terminal to the recipient terminal.

The data formats depicted in FIGS. 5–8 represent embodiments of data formats that may be used in conjunction with the present invention. Other data formats are possible and are contemplated to be within the scope of the present invention.

FIG. 9 depicts a method 900 for implementing step 304 (FIG. 3) of the present invention. Method 900 parses an e-mail document into data portions and determines whether an addressed recipient computer has previously received each data portion in the e-mail document 400. The parsing of the e-mail document 400 into data portions, e.g., text sections and attachment files, is performed at each level of the e-mail document 400. Namely, each e-mail message 410–430 in the e-mail document 400 is parsed into data portions such as text sections and attachment files.

The method 900 starts at step 902 and proceeds to step 904, where processing is performed for each user or recipient computer addressed in the e-mail document 400 to be sent. At step 906, the method 900 references the highest level of the e-mail document 400, e.g., the most recent e-mail message 410 in the e-mail document 400.

The method 900 proceeds to step 908, where a query determines whether a recipient computer has previously received a text section at the current level (initially e-mail message 410) of the e-mail document 400 to be sent. In one embodiment, step 908 may be implemented by comparing identifier fields between a previously sent or received e-mail message and the e-mail message to be sent. Identifier fields within the e-mail messages 410, 420 or 430 may comprise user information, timestamp information, message identifiers and the like. In another embodiment, step 908 may be implemented by identifying the address of the recipient computer in either a TO: field and a CC: field at the current level of the electronic mail document 400. For example, the sender computer of the e-mail document 400 may have previously sent the e-mail message 410, 420 or 430 to the recipient computer. Additionally or alternatively, the sender may have received the same e-mail message that was also sent to the previously addressed recipient computer.

If the addressed recipient has not received the text section at the current level of the e-mail document 400 to be sent, the method 900 proceeds to step 910, where a partial message 500 is queued for sending to the recipient. At step 910, the partial message 500 contains the text section of the e-mail message (at the current level of the e-mail document 400) in the data field 510. The method 900 proceeds to step 912, where processing is performed for each attachment file at the current level of the e-mail document 400.

At step 914, the method 900 queries whether the addressed recipient has previously received the attachment file at the current level of the e-mail document 400. Step 914 may be performed, for example, by determining whether the sender computer previously sent an attachment file to the addressed recipient computer, or by determining the sender computer also received an attachment file previously sent to the recipient computer. Identification of the attachment may be performed in substantially the same manner as in step 908. If the addressed recipient has previously received the attachment file, the method 900 proceeds to step 916, where a partial message 500 containing an attachment pointer in data field 510 is queued. The attachment pointer is utilized to reference an attachment file previously received at the recipient computer. The method 900 returns to step 912, where the next attachment file, if applicable, of the current level of the e-mail document 400 is processed.

If the addressed recipient has not received the attachment file, the method 900 proceeds to step 918, where a determination is made as to whether the attachment file is too large to be sent in its entirety. Namely, step 918 determines whether the attachment file is above a pre-elected threshold size. If the attachment file can be sent in its entirety, the method 900 proceeds to step 920, where a partial message 500 is queued to be sent to the recipient computer. At step 920, the partial message 500 contains an attachment file in the data field 510. The method 900 returns to process the next attachment file at step 912.

If the attachment file is determined as being too large to be sent in its entirety, the method 900 proceeds to step 922, where the attachment file is split into multiple partial attachment files. A partial message 500 is queued for each partial attachment file to be sent to the recipient computer. The method 900 returns to process the next applicable attachment file at step 912. Steps 914 to 922 are repeated for each attachment file at the current level of the e-mail document 400.

Once all the attachment files are processed for the current level of the e-mail document 400, the method 900 proceeds to step 924, where a query determines whether there are any additional levels to process in the e-mail document 400. If there are additional levels to process in the e-mail document 400, the method 900 returns to step 908. Steps 908 to 922 are repeated for each level of the e-mail document 400.

If there are no additional levels to process in the e-mail document 400, the method 900 proceeds to step 928, where the method 900 determines the total number of partial messages 500 for the e-mail document 400 to be sent to the recipient computer. This number is provided in the maximum sequence number field 570 of all the queued partial messages 500. Step 928 also provides the value of sequence number field 560. This value represents the position of a partial message 500 of all the queued partial messages 500 for the e-mail document 400.

Returning to step 908, if the addressed recipient has already received an e-mail message at this level of the e-mail document 400, the method 900 proceeds to step 926, where a partial message 500 containing a text pointer in the data field 510 is queued. The text pointer is utilized to reference a text section of an e-mail message previously received at the recipient computer. In this case, the method 900 proceeds to update value of the maximum sequence number field 570 at step 928 and return to process the next recipient at step 904. After steps 906 to 928 are repeated for each recipient addressed in the e-mail document 400, the method 900 proceeds to step 930, where the method 900 exits, e.g., returns to step 306 of FIG. 3.

FIG. 10 depicts a method 1000 for implementing step 310 at the recipient computer. Specifically, method 1000 searches for local copies of text sections and attachment files referenced by respective text pointers and attachment pointers contained in the partial message 500. The method 1000 starts at step 1002 and proceeds to process the partial messages at step 1004. The method 1000 proceeds to step 1006, where a query determines whether the partial message 500 contains a text pointer in the data field 510. Namely, step 1006 determines whether the message type field 550 identifies the partial message 500 as containing a text pointer. If the partial message 500 contains a text pointer, the method 1000 proceeds to step 1008, where a query determines whether the text section referenced by the text pointer exists in the message storage 214 at the recipient computer. In one embodiment, the specified e-mail message exists in the message storage 214 if the user and timestamp information of the e-mail message in the message storage 214 is substantially similar to information in the user field 610 and timestamp 620 of the text pointer 600.

If the specified e-mail message or text does not exist, the method 1000 proceeds to step 1010, where a request message 800 is queued for the referenced text. This case occurs when the specified e-mail message with the referenced text is no longer present, e.g., deleted, in the recipient computer. The missing text must be requested and retrieved from the sender computer. The method 1000 returns to step 1004, where the next partial message 500 is processed.

If the specified e-mail message does exist, the method 1000 proceeds to step 1012, where the specified e-mail message (with included text sections and attachment files) is retrieved from the message storage 214 of the recipient computer and loaded with the other partial messages received at the recipient computer. In this manner, the recipient computer may readily construct the e-mail document from the data portions in the partial messages and retrieved from the message storage 214. The method 1000 returns to step 1004, where the next partial message 500 is processed.

Returning to step 1006, if the partial message 500 does not contain a text pointer, the method 1000 proceeds to step 1014, where a query determines whether the partial message 560 contains an attachment pointer. Step 1014 determines whether the message type field 550 identifies the partial message 500 as containing an attachment pointer. If the partial message 500 does not contain an attachment pointer, the method 1000 returns to process the next partial message 500 at step 1004.

If the partial message 500 contains an attachment pointer, the method 1000 proceeds to step 1016, where a query determines whether an e-mail message containing the attachment file referenced by the attachment pointer is in the message storage 214 of the recipient computer. In one embodiment, step 1016 determines whether the user field 710 and timestamp 720 are substantially similar to user and timestamp information of e-mail message in the message storage 214. If the specified message is not found in the message storage, the method 1000 proceeds to step 1018, where a query determines whether an auto request feature is enabled. Step 1018 determines whether to automatically request the referenced attachment file from the sender computer or the terminal sending the partial messages 500.

If the auto request feature is not enabled, the method 1000 proceeds to step 1020, where a hyperlink or access link is provided for the attachment file. A request for the missing attachment file will occur when the recipient or user selects or clicks on the hyperlink. After providing the hyperlink, the method 1000 returns to process the next partial message 500 at step 1004. If the auto request feature is enabled, the method 100 proceeds to step 1022, where a request message 800 is queued for the referenced attachment file. In this case where the auto request feature is enabled, the referenced attachment file is no longer present, e.g., deleted, in the recipient computer. The referenced attachment file must be requested and retrieved from the sender computer. The method 1000 returns to process the next partial message 500 at step 1004.

Returning to step 1016, if the specified e-mail message is found in the message storage, the method 1000 proceeds to step 1024, where a query determines whether the e-mail message contains the referenced attachment file. If the e-mail message does not contain the referenced attachment file, the method 1000 proceeds to step 1018. If the e-mail message contains the referenced attachment file, the method 1000 proceeds to step 1026, where the referenced attachment file is retrieved from the message storage 214 of the recipient computer and loaded with the other partial messages received at the recipient computer. In this manner, the recipient computer may readily construct the e-mail document from the data portions in the partial messages and retrieved from the message storage 214. Steps 1006 to 1026 are repeated for each partial message. Once all partial messages 500 are processed for the e-mail document 400, the method 1000 exits at step 1028, e.g., returns to step 312 of FIG. 3.

FIG. 11 depicts a method 1100 for implementing step 314 (FIG. 3) at the sender computer. Specifically, method 1100 searches for text sections and attachment files referenced in the request message 800. The method 1100 starts at step 1102 and proceeds to step 1104 where a query determines whether any request messages 800 have been received from the recipient computer. The method 1100 proceeds to process each request message 800 at step 1106.

At step 1108, the method 1100 queries whether the request message 800 is a request for an attachment file. For example, step 1108 may determine the message type 540 after processing the sequence number field 830 in the request message 800. If the request message 800 is a request for an attachment file, the method 1100 retrieves the attachment file from memory in the sender computer at step 1110 and sends the requested attachment file to the requesting computer in step 1112. This attachment file may be sent in a data field 510 of a partial message 500. The method 1100 returns to process the next request message 800 at step 1106.

If the request message is not a request for an attachment file, the method 1100 proceeds to step 1114, where a query determines whether the request message 800 is a request for text. Step 1114 may be determined in a similar manner as step 1108. If the request message is also not a request for text, the method 1100 returns to retrieve the next request message at step 1106. If the request message is a request for text, the method 1100 proceeds to retrieve the requested text at step 1116 and sends the requested text. As with step 1112, the text may be sent in a partial message 800.

The method 1100 proceeds to step 1120, where each attachment file contained in requested text is processed. For each attachment file in the requested text, the attachment file is retrieved from the memory of the sender computer at step 1122 and sent to the requesting computer at step 1124. Once all the attachment files within the requested text are processed, i.e., retrieved from the sender computer and sent to the recipient computer, the method 1100 returns to process the next request message at step 1106. In this manner, the recipient computer not only receives the requested text section, but all attachments contained within the requested text section.

After all the request messages 800 have been processed for the e-mail document 400, the method 1100 exits at step 1126, e.g., returns to step 316 of FIG. 3. Returning back to step 1104, if no request messages have been received, the method 1100 exits at step 1126.

Although various embodiments which incorporate the teachings of the present invention have been shown and described in detail herein, those skilled in the art can readily devise many other varied embodiments that still incorporate these teachings.

What is claimed is:

1. A method for sending an electronic mail document containing a data portion, the method comprising:
   determining whether a recipient computer addressed in the electronic mail document has previously received the data portion;
   sending the data portion to the recipient computer if the recipient computer has not previously received the data portion;
   sending a pointer to the recipient computer if the recipient computer has previously received the data portion, where the pointer references an available local copy of the data portion at the recipient computer; and
   sending the data portion if the data portion is unavailable at the recipient computer.

2. The method of claim 1 wherein sending the data portion when the data portion is unavailable at the recipient computer is performed in response to a request by the recipient computer.

3. The method of claim 1 wherein the electronic mail document comprises at least two levels of electronic mail messages, in which an electronic mail message at a higher level of the electronic mail document is nested in an electronic mail message at a lower level of the electronic mail document, and wherein determining, sending the data portion, and sending the pointer are repeated for each level of the electronic mail document.

4. The method of claim 1 wherein determining comprises:
   identifying a recipient computer as having received the data portion if the recipient computer is addressed in at least one of a TO: field and a CC: field of the data portion.

5. The method of claim 1 wherein the data portion comprises at least one of a text section and an attachment file.

6. The method of claim 1 wherein the data portion comprises a text section comprising a body of an electronic mail message contained in the electronic mail document.

7. The method of claim 1 wherein the data portion comprises an attachment file comprising at least one of a text file, a video file, a graphic file, and a data file.

8. A method for processing an electronic mail document received by a recipient computer, the method comprising:
   receiving at least one partial message previously parsed from an electronic mail document at a sender computer, where the at least one partial message comprises a data portion if the data portion has not been previously received by the recipient computer and comprises a pointer referencing an available local copy of the data portion in the recipient computer if the data portion was previously received;
   determining whether the local copy of the data portion referenced by the pointer is available in a memory unit of the recipient computer;

retrieving the local copy of the data portion referenced by the pointer if the local copy of the data portion is available in the memory unit of the recipient computer; and requesting the data portion from a sender computer of the at least one partial message if the local copy of the data portion is unavailable in the memory unit of the recipient computer.

9. The method of claim 8 wherein determining comprises:
identifying the data portion as available if the at least one partial message has a message identifier that is substantially similar to a message identifier in another electronic mail document in the memory unit of the recipient computer.

10. The method of claim 8 further comprising:
providing a hyperlink utilized for requesting the data portion from a sender computer of the at least one partial message if the data portion is unavailable in the memory unit of the recipient computer.

11. A method for processing an electronic mail document having a data portion, the method comprising:
determining whether a recipient computer addressed in the electronic mail document has previously received the data portion;
sending the data portion from a sender computer to the recipient computer if the recipient computer has not previously received the data portion and the data portion is unavailable at the recipient computer;
sending a pointer from a sender computer to the recipient computer if the recipient computer has previously received the data portion, where the pointer is used to reference an available local copy of the data portion at the recipient computer;
receiving at least one of the data portion and the pointer at the recipient computer; and
constructing the electronic document at the recipient computer, where the electronic document is constructed from at least one of the available local copy of the data portion and the pointer.

12. The method of claim 11 wherein the method is embodied as a program contained in a computer readable medium.

13. An apparatus for sending an electronic mail having a data portion comprising:
a memory unit for storing a mail routine; and
a processor coupled to the memory unit and configured to execute the mail routine retrieved from the memory unit, determine whether a recipient computer addressed in the electronic mail document has previously received the data portion, send the data portion to the recipient computer if the recipient computer not previously received the data portion, and send a pointer to the recipient computer if the recipient computer has previously received the data portion, where the pointer references an available local copy of the data portion at the recipient computer and sending the data portion if the data portion is unavailable at the recipient computer.

14. A computer readable medium storing a software program that, when executed by a processor of a computer, causes the computer to perform a method comprising:
determining whether a recipient computer has previously received an electronic mail document having a data portion;
sending the data portion to the recipient computer if the recipient computer has not previously received the data portion;
sending a pointer to the recipient computer if the recipient computer has previously received the data portion, where the pointer references an available local copy of the data portion at the recipient computer; and
sending the data portion if the data portion is unavailable at the recipient computer.

15. The computer readable medium of claim 14 wherein sending the data portion when the data portion is unavailable at the recipient computer is performed in response to a request by the recipient computer.

16. The computer readable medium of claim 14 wherein the electronic mail document comprises at least two levels of electronic mail messages, an electronic mail message at a higher level of the electronic mail document is nested in an electronic mail message at a lower level of the electronic mail document, and determining, sending the data portion, and sending the pointer are repeated for each level of the electronic mail document.

17. The computer readable medium of claim 14 wherein determining comprises:
identifying a recipient computer as having received the data portion if the recipient computer is addressed in at least one of a TO: field and a CC: field of the electronic mail document.

18. The computer readable medium of claim 14 wherein the data portion comprises at least one of a text section and an attachment file.

19. The computer readable medium of claim 18 wherein the text section comprises a body of an electronic mail message contained in the electronic mail document.

20. The computer readable medium of claim 18 wherein the attachment file comprises at least one of a text file, a video file, a graphic file, and a data file.

21. A computer readable medium storing a software program, when said software program executed by a processor of a computer, causes the computer to perform a method comprising:
receiving at least one partial message previously parsed from an electronic mail document at a sender computer, where the at least one partial message comprises a data portion if the data portion has not been received previously and comprises a pointer referencing an available local copy of the data portion in the recipient computer if the data portion was previously received,
determining whether the local copy of the data portion referenced by the pointer is available in a memory unit of the recipient computer;
retrieving the local copy of the data portion referenced by the pointer if the local copy of the data portion is available in the memory unit of the recipient computer; and
requesting the data portion from a sender computer of the at least one partial message if the local copy of the data portion is unavailable in the memory unit of the recipient computer.

22. The computer readable medium of claim 21 wherein determining comprises:
identifying the data portion as available if the at least one partial message has a message identifier that is substantially similar to a message identifier in another electronic mail document in the memory unit of the recipient computer.

23. The computer readable medium of claim 21 wherein the method further comprises:
providing a hyperlink utilized for requesting the data portion from a sender computer of the at least one partial message if the data portion is unavailable in the memory unit of the recipient computer.

* * * * *